(12) United States Patent
Lin et al.

(10) Patent No.: US 7,557,374 B2
(45) Date of Patent: Jul. 7, 2009

(54) SUBSTRATES AND METHODS FOR FABRICATING THE SAME

(75) Inventors: Yan-Ru Lin, Taichung (TW); Song-Yeu Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 148 days.

(21) Appl. No.: 11/627,219

(22) Filed: Jan. 25, 2007

(65) Prior Publication Data

US 2008/0061297 A1 Mar. 13, 2008

(30) Foreign Application Priority Data

Sep. 11, 2006 (TW) .............................. 95133453 A

(51) Int. Cl.
*H01L 29/04* (2006.01)
(52) U.S. Cl. ................................. 257/64; 257/E21.462
(58) Field of Classification Search .................. 257/64, 257/E21.462
See application file for complete search history.

(56) References Cited

U.S. PATENT DOCUMENTS

2007/0045607 A1 * 3/2007 Chen et al. ..................... 257/14

OTHER PUBLICATIONS

Lee et al. Epitaxial oxide thin-film phosphor for low voltage FED application, Epitaxial oxide thin-film phosphors for low voltage FED applications; Electron-Emission Materials, Vacuum Microelectronics and Flat-Panel Displays. Symposium (Materials Research Society Symposium Proceedings vol. 621), 2001, p. Q2.4.1-6, 9 refs, pp. xvii+548, ISBN: 1-5589.*

Yang et al.Journal of Crystal Growth vol. 287, Issue 1, Jan. 18, 2006, pp. 194-198; Proceedings of the International Conference on Materials for Advanced Technologies (ICMAT 2005) Symposium N—ZnO and Related Materials.*

Yong Eui Lee et al, "Blue photoluminescence in ZnGa2O4 thin-film phosphors", Journal of Applied Physics, Feb. 1, 2001. p. 1653-1656, vol. 89, No. 3, 2001 American Institue of Physics, USA.

Yong Eui Lee et al, "Enhanced ultraviolet photoconductivity in semiconducting ZnGa2O4 thin fimls", Journal of Applied Physics, Oct. 15, 2001, p. 3863-3866, vol. 90, No. 8, 2001 American Institute of Physics, USA.

Yong Eui Lee et al, "Enhanced photoluminescene in epitaxial ZnGa2O4:Mn thin-film phosphors using pulsed-laser deposition", Applied Physics Letters, May 24, 1999, p. 3155-3157, vol. 74, No. 21, 1999 American Institute of Physics, USA.

* cited by examiner

*Primary Examiner*—Thomas L Dickey
*Assistant Examiner*—Selim Ahmed
(74) *Attorney, Agent, or Firm*—Quintero Law Office

(57) ABSTRACT

An embodiment of the invention provides a substrate. The substrate comprises a single crystal substrate. An epitaxial buffer film is on the single crystal substrate. An epitaxial $ZnGa_2O_4$ is on the epitaxial buffer film.

20 Claims, 4 Drawing Sheets

SUBSTRATES AND METHODS FOR FABRICATING THE SAME

BACKGROUND OF THE INVENTION

1. Field of the Invention

The invention relates to substrates and methods for fabricating the same, and more particularly to epitaxial $ZnGa_2O_4$ substrates and methods for fabricating the same.

2. Description of the Related Art

Flat panel display devices, such as field emission displays (FEDs), plasma display panels (PDPs), and thin-film electroluminescent devices, require highly efficient phosphor material. Oxide phosphors offer potential advantages because of their superior stability under electron bombardment and excellent luminescent property.

$ZnGa_2O_4$ are oxide phosphors attractive for both cathodoluminescent and electroluminescent applications. $ZnGa_2O_4$ possesses a cubic spinel crystal structure and wide energy band gap of about 4.4 to 5.0 e.V. This material exhibits an intense green luminescence when doped with Mn and blue luminescence without doping via a transition of a self-activated center. It has been suggested that by doping with various activators, including $Mn^{2+}$, $Eu^{3+}$ and $Ce^{3+}$ $ZnGa_2O_4$ phosphors can attain full color luminescence. $ZnGa_2O_4$ is also an interesting ultraviolet-transparent conductive oxide as moderate conductivity can be induced by annealing under a reducing atmosphere at high temperature.

There have been several studies on $ZnGa_2O_4$. For example, Yong Eui Lee et al. disclose "Enhanced ultraviolet photoconductivity in semiconducting $ZnGa_2O_4$ thin films" in JOURNAL OF APPLIED PHYSICS in volume 90, number 8. Yong Eui Lee et al. disclose "Blue photoluminescence in $ZnGa_2O_4$ thin film phosphors" in JOURNAL OF APPLIED PHYSICS in volume 89, number 3. Yong Eui Lee et al. disclose "Enhanced photoluminescence in epitaxial $ZnGa_2O_4$:Mn thin film phosphors using pulsed laser deposition" in APPLIED PHYSICS LETTER in volume 74, number 21.

Although numerous studies involve epitaxial $ZnGa_2O_4$ film, $ZnGa_2O_4$ can currently only be grown epitaxially on MgO substrates at high temperature. Unfortunately, MgO substrate is not only expensive, but also easily hydrolyzed in a moist ambient. Thus, devices and methods for overcoming obstacles to epitaxial growth of $ZnGa_2O_4$ film are desirable.

BRIEF SUMMARY OF THE INVENTION

A detailed description is given in the following embodiments with reference to the accompanying drawings.

Substrates are provided. An embodiment of a substrate comprises a single crystal substrate. An epitaxial buffer film is on the single crystal substrate. An epitaxial $ZnGa_2O_4$ film is on the epitaxial buffer film.

Methods for fabricating substrates are provided. An embodiment of a method for fabricating a substrate comprises providing a single crystal substrate. A buffer film is epitaxially grown on the single crystal substrate. A $ZnGa_2O_4$ film is epitaxially grown on the epitaxial buffer film.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiment 1

Figure 1:
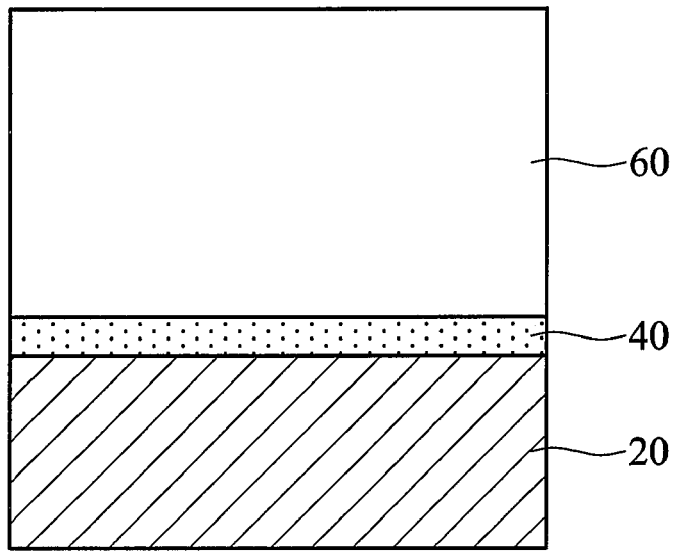
FIG. 1 is a schematic view showing a substrate with an epitaxial $ZnGa_2O_4$ film thereon according to an embodiment of the invention.

FIG. 1 is a schematic view showing an exemplary embodiment of an epitaxial $ZnGa_2O_4$ substrate 10 and methods for fabricating the same. Referring to FIG. 1, a single crystal substrate 20 is provided. The single crystal substrate 20 may comprise Si, sapphire, MgO or other single crystal material.

Next, a buffer film 40 is epitaxially grown on the single crystal substrate 20. Preferably, there is little lattice mismatching between the buffer film 40 and a sequentially formed $ZnGa_2O_4$ film. For example, the buffer film 40 may comprise $TiN_x(x \leq 1)$, referred to as rock salt TiN. Lattice mismatching between rock salt TiN and $ZnGa_2O_4$ is about 1.76%. Preferably, the buffer film 40 has a thickness of about 1 nm to about 50,000 nm. In one embodiment, the epitaxial growth of the buffer film 40 on the single substrate 20 is performed by reactive direct current (D.C.) sputtering or pulsed-laser deposition (PLD). For example, epitaxial rock salt TiN may be formed on the single crystal substrate 20 by reactive DC sputtering, wherein during the reactive DC sputtering process, a Ti target may be used and the single crystal substrate 20 may be heated to a temperature of about 600° C. in an ambiance containing $N_2$ and Ar gas.

Thereafter, a $ZnGa_2O_4$ film 60 is epitaxially grown on the buffer film 40. The $ZnGa_2O_4$ has a spinel crystal structure. Preferably, the $ZnGa_2O_4$ film 60 has a thickness of about 10 nm to about 50,000 nm. The epitaxial $ZnGa_2O_4$ film 60 may be formed on the buffer film 40 by, for example, DC sputtering which may use $ZnGa_2O_4$ as a target. In one embodiment, as-deposited $ZnGa_2O_4$ film is amorphous, an annealing process is further performed to transform the amorphous $ZnGa_2O_4$ film to an epitaxial film. The $ZnGa_2O_4$ film may be annealed at a heating rate of 20° C./second to a temperature ranging from about 200° C. to 700° C. for a duration of about 30 minutes. The single crystal substrate 20 with the buffer film 40 and the $ZnGa_2O_4$ film 60 formed thereon is then furnace-cooled to room temperature which may take about 30 minutes. Alternately, the annealing process may comprise rapid thermal annealing performed at a heating rate of 50° C./second to a temperature ranging from about 400° C. for a duration of about 10 seconds to 1 minute. The single crystal substrate 20 with the buffer film 40 and the $ZnGa_2O_4$ film 60 formed thereon is then furnace-cooled to room temperature. The as-deposited amorphous $ZnGa_2O_4$ (not shown) is transformed to the epitaxial $ZnGa_2O_4$ film 60 by one of the abovementioned or another annealing process. In other embodiments, during deposition of the $ZnGa_2O_4$ film 60 on the buffer film 40, the single crystal substrate 20 and the buffer film 40 is simultaneously heated to about 200° C. or above, preferably about 200° C. to 1000° C. Then, the epitaxial $ZnGa_2O_4$ film 60 grown on the buffer film 40 is obtained after the $ZnGa_2O_4$ deposition process.

Embodiment 2

Figure 2:
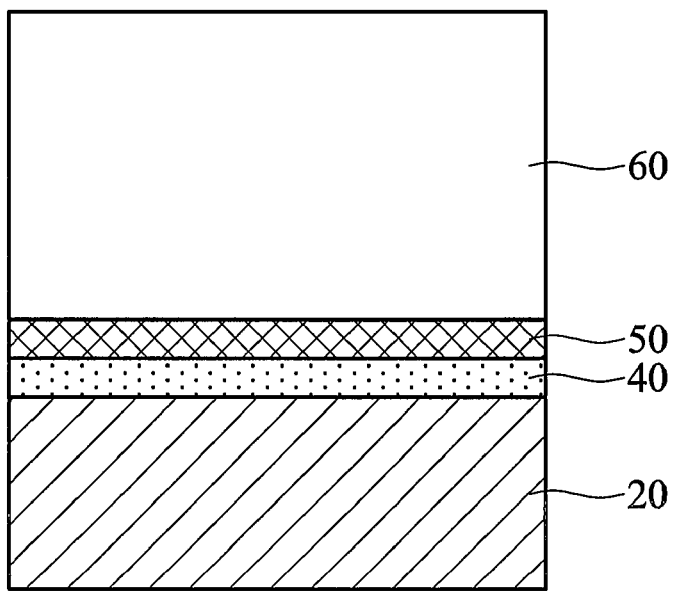
FIG. 2 is a schematic view showing a substrate with an epitaxial $ZnGa_2O_4$ film thereon according to another embodiment of the invention.

FIG. 2 is a schematic view showing another exemplary embodiment of an epitaxial $ZnGa_2O_4$ substrate 20 and methods for fabricating the same. The inventor has found that the epitaxial $ZnGa_2O_4$ film 60 may crack due to great stress produced during the time the epitaxial $ZnGa_2O_4$ film 60 is coherent with the buffer film 40. Thus, the second embodiment is provided for sake of preventing cracks in the epitaxial $ZnGa_2O_4$ film and/or the buffer film 40. Herein, the same structures or materials have the same labels as FIG. 1.

A substrate 15 with an epitaxial $ZnGa_2O_4$ film 60 thereon comprises a single crystal substrate 20, a buffer film 40 epitaxially grown on the single crystal substrate 20, a stress buffer film 50 epitaxially grown on the buffer film 40, and the $ZnGa_2O_4$ film 60 epitaxially grown on the stress buffer film 50. Material, thicknesses and fabrication of the single crystal substrate 20 and the buffer film 40 in this embodiment are approximately the same as those in the first embodiment, thus descriptions thereof are omitted for brevity.

After the buffer film 40 is epitaxially grown on the single crystal substrate 20, the stress buffer film 50 is epitaxially grown on the buffer film 40. Because the sequentially formed epitaxial $ZnGa_2O_4$ film 60 and the buffer film 40 such as TiN are hard and brittle, the $ZnGa_2O_4$ film 60 may easily crack. A soft material may be used as the stress buffer film 50 between the epitaxial $ZnGa_2O_4$ film 60 and the buffer film 40 to buffer stress in the $ZnGa_2O_4$ film 60 and the buffer film 40. Preferably, the stress buffer material 50 may comprise $Zn_2TiO_4$, and the stress buffer film 50 may have thickness of about 1 nm to 50,000 nm. In one embodiment, after forming the epitaxial buffer film 40 such as TiN on the single crystal substrate 20, the single crystal substrate 20 with the epitaxial TiN film 40 formed thereon is then disposed with ZnO in a thermal furnace containing $O_2$ and Ar. When the single crystal substrate 20 is heated to a temperature of about 600° C., the $ZnGa_2O_4$ film which functions as the stress buffer film 50 will be formed on the epitaxial TiN film. In another embodiment, a stress buffer film 50 may be formed on the buffer film 40 by a deposition process, such as sputtering. After the stress buffer film 50 is epitaxially grown on the buffer film 40, the $ZnGa_2O_4$ film 60 is then epitaxially grown on the stress buffer film 50. The fabrication method and thickness of the epitaxial $ZnGa_2O_4$ film 60 in this embodiment are the same as those in the first embodiment, thus descriptions thereof are omitted for brevity.

X-ray Diffraction of an Epitaxial $ZnGa_2O_4$ Film

Figure 3A:
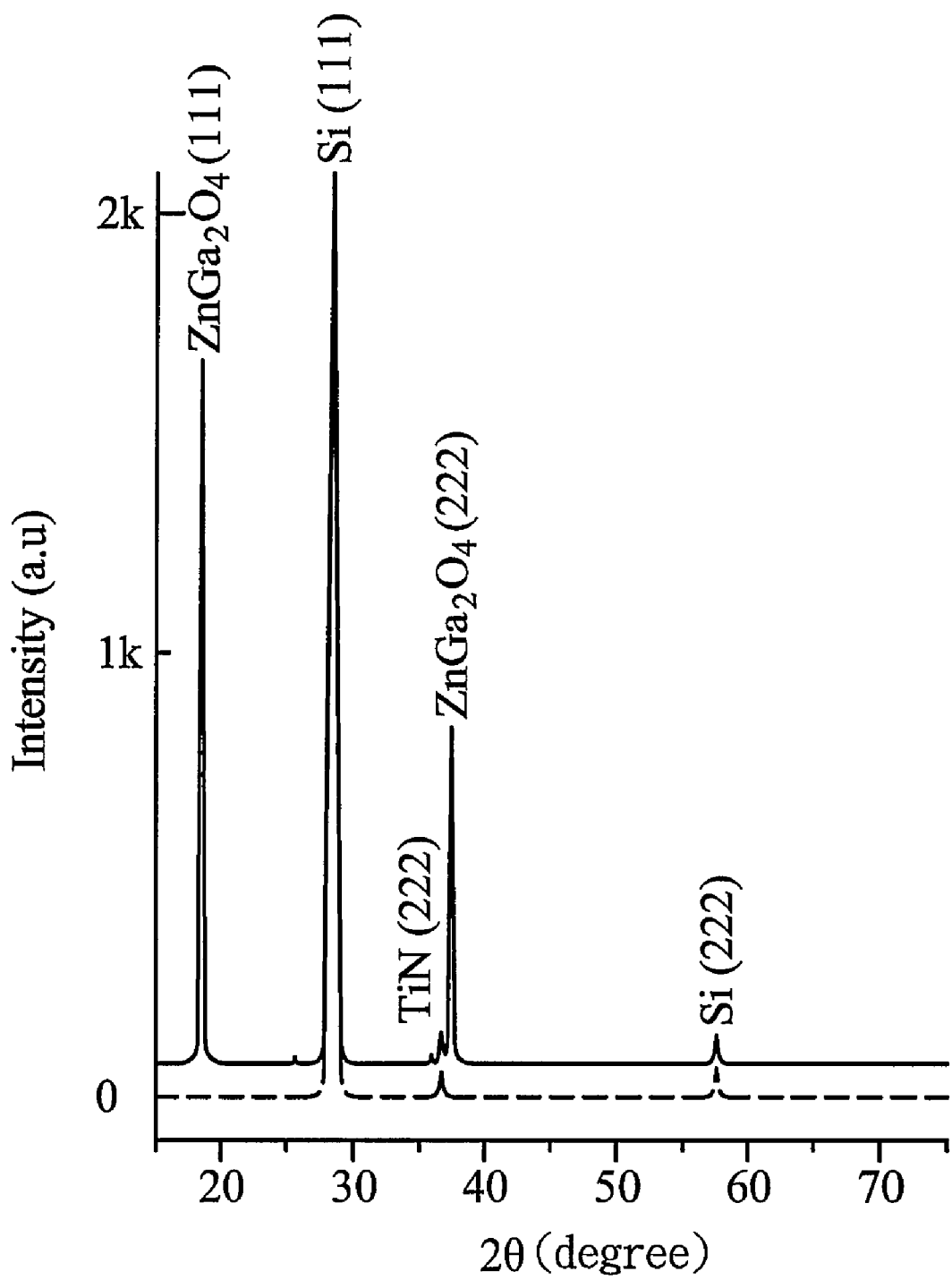
FIG. 3a-3b are diagrams showing X-ray diffraction $\theta/2\theta$ of the as-deposited $ZnGa_2O_4$ film and annealed $ZnGa_2O_4$ film according to embodiments of the invention.
Figure 3B:
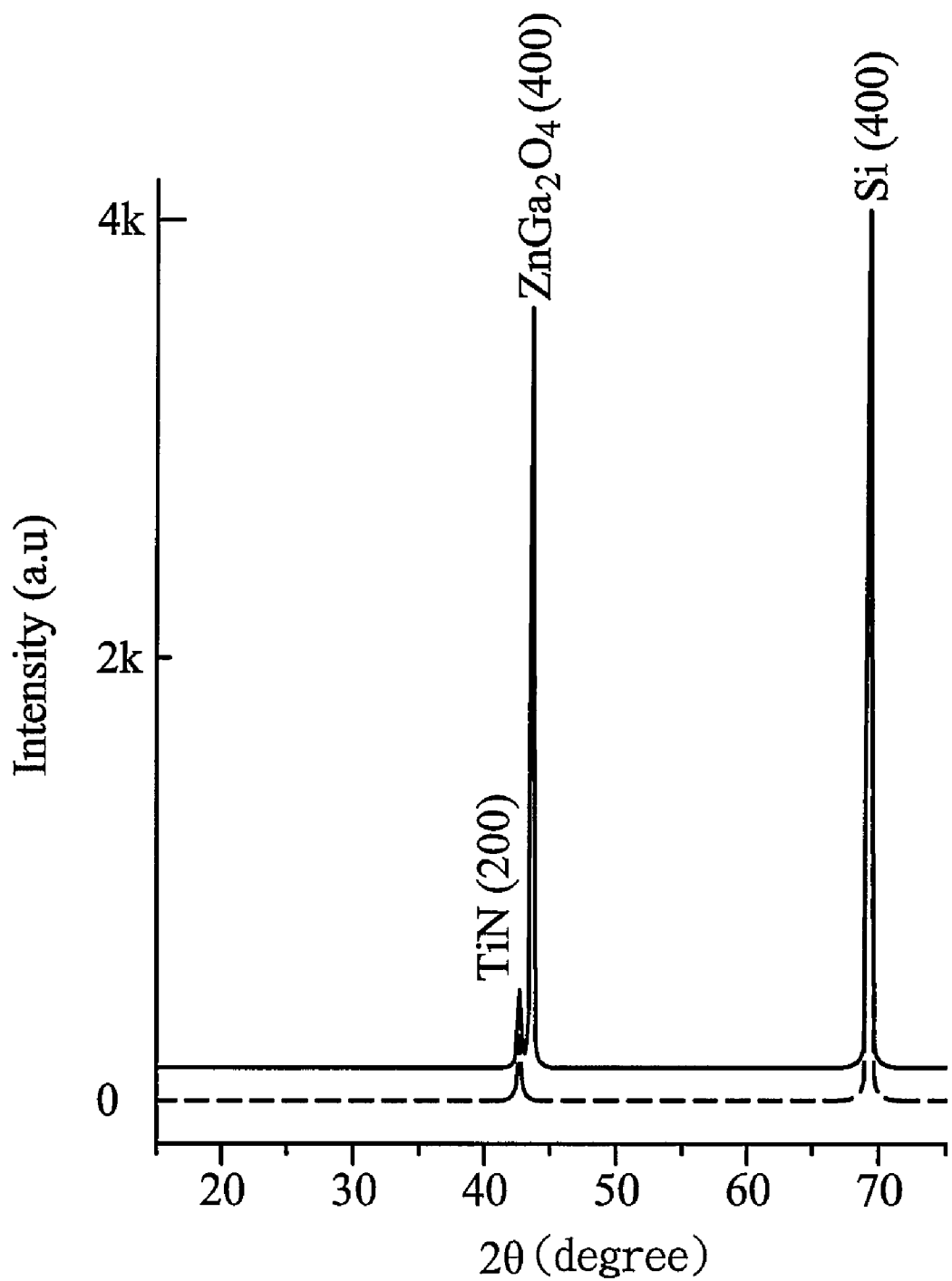

FIGS. 3a-3b are diagrams showing X-ray diffraction θ/2θ of the as-deposited $ZnGa_2O_4$ film and annealed $ZnGa_2O_4$ film according to the aforementioned embodiments. FIGS. 3a-3b are diagrams demonstrating that the epitaxial $ZnGa_2O_4$ film is successfully grown on the buffer film by performing an annealing process. Herein, the dotted line shows X-ray diffraction θ/2θ of the as-deposited $ZnGa_2O_4$ film, while the solid line shows X-ray diffraction θ/2θ of the annealed $ZnGa_2O_4$ film. In FIG. 3a, the (111) epitaxial TiN film is grown on the (111) single crystal Si substrate. The $ZnGa_2O_4$ film deposits on the (111) TiN film on the (111) single crystal Si substrate; however the as-deposited $ZnGa_2O_4$ film is an amorphous film. The amorphous as-deposited $ZnGa_2O_4$ film is transformed to the epitaxial (111) and (222) $ZnGa_2O_4$ film after an annealing process. The annealing process is performed by at a heating rate of 20° C./second to a temperature of about 400° C. for a duration of about 30 minutes, and the single crystal Si substrate with the epitaxial TiN film and the $ZnGa_2O_4$ film formed thereon is then furnace-cooled to room temperature. In FIG. 3b, the (200) epitaxial TiN film is grown on the (100) single crystal Si substrate. The $ZnGa_2O_4$ film deposits on the (200) TiN film on the (100) single crystal Si substrate; however the as-deposited $ZnGa_2O_4$ film is an amorphous film. The amorphous as-deposited $ZnGa_2O_4$ film is transformed to the epitaxial (400) $ZnGa_2O_4$ film after an annealing process. The annealing process is performed by heating at a rate of 20° C./second to a temperature of about 400° C. for a duration of about 30 minutes, and then the single crystal Si substrate with the epitaxial TiN film and the $ZnGa_2O_4$ film formed thereon is then furnace-cooled to room temperature.

Photoluminescence (PL) Emission Spectra of $ZnGa_2O_4$ Films

Figure 4:
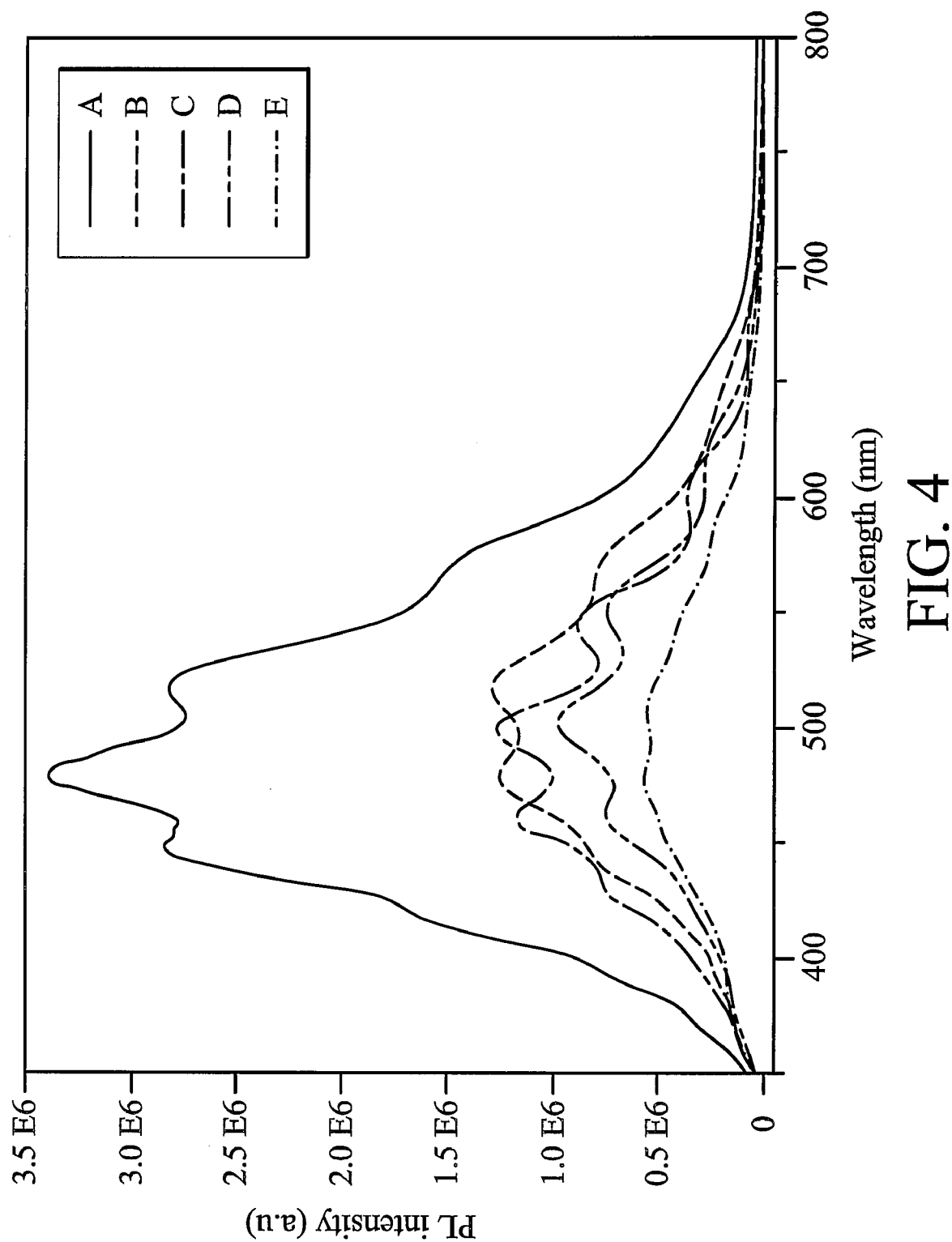
FIG. 4 is a diagram showing Photoluminescence (PL) emission spectra of $ZnGa_2O_4$ films with varied crystal orientations and annealing temperatures according to an embodiment of the invention.

FIG. 4 is a diagram showing PL emission spectra of $ZnGa_2O_4$ films with varied crystal orientations and annealing temperatures according to an embodiment of the invention. In FIG. 4, line A shows a PL emission spectrum of an epitaxial (100) $ZnGa_2O_4$ film according to an embodiment of the invention. The epitaxial (100) $ZnGa_2O_4$ film is grown on a TiN film which is formed on a Si substrate. The (100) $ZnGa_2O_4$/TiN/Si is formed by performing an annealing process at a temperature of about 400° C. Line B shows a PL emission spectrum of an epitaxial (100) $ZnGa_2O_4$ film according to an embodiment of the invention. The epitaxial (100) $ZnGa_2O_4$ film is grown on a TiN film which is formed on a Si substrate. The (100) $ZnGa_2O_4$/TiN/Si is formed by performing an annealing process at a temperature of about 700° C. Line C shows a PL emission spectrum of an epitaxial (111) $ZnGa_2O_4$ film according to an embodiment of the invention. The epitaxial (111) $ZnGa_2O_4$ film is grown on a TiN film which is formed on a Si substrate. The (111) $ZnGa_2O_4$/TiN/Si is formed by performing an annealing process at a temperature of about 400° C. Line D shows a PL emission spectrum of an epitaxial (111) $ZnGa_2O_4$ film according to an embodiment of the invention. The epitaxial (111) $ZnGa_2O_4$ film is grown on a TiN film which is formed on a Si substrate. The (111) $ZnGa_2O_4$/TiN/Si is formed by performing an annealing process at a temperature of about 700° C. Line E shows a PL emission spectrum of an conventional poly crystal $ZnGa_2O_4$ film, wherein an amorphous $ZnGa_2O_4$ film is formed on a glass substrate. An annealing process at a temperature of about 400° C. for 30 minutes is performed to transform the amorphous $ZnGa_2O_4$ film to the poly crystal $ZnGa_2O_4$ film. As shown in FIG. 4, the epitaxial $ZnGa_2O_4$ films formed by embodiments of the invention such as lines A, B, C and D have greater PL intensity than a conventional poly crystal $ZnGa_2O_4$ film such as line E. Furthermore, lines A, B, C and D have clearer peaks than line E, thus characteristic spectra may be separated in lines A, B, C and D.

As described, an epitaxial $ZnGa_2O_4$ film may be grown on any single crystal substrate through the buffer film underlying the $ZnGa_2O_4$ film. It is not necessary to grow an epitaxial $ZnGa_2O_4$ film on a MgO substrate, thereby reducing fabrication cost. An amorphous $ZnGa_2O_4$ film is transformed to an epitaxial $ZnGa_2O_4$ film by performing only an annealing process, thus the fabrication method is simplified.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate, comprising:
a single crystal substrate;
a buffer film epitaxially grown on the single crystal substrate;
a $ZnGa_2O_4$ film epitaxially grown on the buffer film; and
a stress buffer film epitaxially grown between the buffer film and the $ZnGa_2O_4$ film.

2. The substrate as claimed in claim 1, wherein the buffer film comprises rock salt structure TiN.

3. The substrate as claimed in claim 1, wherein the single crystal substrate comprises Si, MgO or sapphire.

4. The substrate as claimed in claim 1, wherein the stress buffer film comprises $Zn_2TiO_4$.

5. The substrate as claimed in claim 1, wherein the buffer film has a thickness of about 1 nm to about 50,000 nm.

6. The substrate as claimed in claim 1, wherein the $ZnGa_2O_4$ film has a thickness of about 10 nm to about 50,000 nm.

7. The substrate as claimed in claim 1, wherein the stress buffer film has a thickness of about 1 nm to about 50,000 nm.

8. The substrate as claimed in claim 1, wherein the $ZnGa_2O_4$ film comprises (100) or (111) oriented $ZnGa_2O_4$.

9. A method for fabricating the substrate as claimed in claim 1, comprising:
providing a single crystal substrate;
epitaxially growing a buffer film on the single crystal substrate;
epitaxially growing a $ZnGa_2O_4$ film on the buffer film; and
epitaxially growing a stress buffer film between the buffer film and the $ZnGa_2O_4$ film.

10. The method for fabricating the substrate as claimed in claim 9, wherein the buffer film comprises rock salt TiN.

11. The method for fabricating the substrate as claimed in claim 9, wherein the single crystal substrate comprises Si, MgO or sapphire.

12. The method for fabricating the substrate as claimed in claim 9, wherein the stress buffer film comprises $Zn_2TiO_4$.

13. The method for fabricating the substrate as claimed in claim 9, wherein the epitaxial growth of the $ZnGa_2O_4$ film on the buffer film comprises depositing an amorphous $ZnGa_2O_4$ film on the buffer film.

14. The method for fabricating the substrate as claimed in claim 9, wherein the epitaxial growth of the $ZnGa_2O_4$ film on the buffer film comprises performing an annealing process.

15. The method for fabricating the substrate as claimed in claim 14, wherein the annealing process is performed at a temperature ranging from 400° C. to 700° C.

16. The method for fabricating the substrate as claimed in claim 14, wherein the annealing process comprises a rapid thermal annealing process.

17. The method for fabricating the substrate as claimed in claim 13, wherein the amorphous $ZnGa_2O_4$ film is deposited on the buffer film by using DC sputtering.

18. The method for fabricating the substrate as claimed in claim 9, wherein the epitaxial growth of the buffer film on the single substrate is performed by reactive DC sputtering or pulsed-laser deposition.

19. The method for fabricating the substrate as claimed in claim 9, wherein the epitaxial growth of the stress buffer film between the buffer film the $ZnGa_2O_4$ film comprises reacting the buffer film with Zn in a furnace containing $O_2$ and Ar gas.

20. The method for fabricating the substrate as claimed in claim 9, wherein the epitaxial growth of the $ZnGa_2O_4$ film on the buffer film comprises heating the substrate and the buffer film to a temperature of about 200° C. to 1000° C.

* * * * *